United States Patent
Choi et al.

(10) Patent No.: US 8,243,124 B2
(45) Date of Patent: Aug. 14, 2012

(54) FACE DETECTION APPARATUS AND DISTANCE MEASUREMENT METHOD USING THE SAME

(75) Inventors: Seung Min Choi, Daejeon (KR); Ji Ho Chang, Daejeon (KR); Jae Il Cho, Daejeon (KR); Dae Hwan Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 536 days.

(21) Appl. No.: 12/546,156

(22) Filed: Aug. 24, 2009

(65) Prior Publication Data
US 2010/0259597 A1    Oct. 14, 2010

(30) Foreign Application Priority Data
Apr. 14, 2009 (KR) .................... 10-2009-0032372

(51) Int. Cl.
*H04N 13/02* (2006.01)
(52) U.S. Cl. ............ 348/46; 348/42; 348/347; 348/700; 396/80
(58) Field of Classification Search .................... 348/42, 348/46, 47, 48, 49, 347, 700; 396/80
See application file for complete search history.

(56) References Cited

U.S. PATENT DOCUMENTS

| | | | |
|---|---|---|---|
| 6,381,360 B1 * | 4/2002 | Sogawa | 382/154 |
| 2005/0089212 A1 * | 4/2005 | Mashitani et al. | 382/154 |
| 2010/0259597 A1 * | 10/2010 | Choi et al. | 348/46 |

FOREIGN PATENT DOCUMENTS
JP    2007-024647    2/2007
* cited by examiner

*Primary Examiner* — Michael Won
(74) *Attorney, Agent, or Firm* — Staas & Halsey LLP

(57) ABSTRACT

Provided are a face detection apparatus and a distance measurement method using the same. The face detection apparatus detects a face using left and right images which are acquired from a stereo camera. The face detection apparatus measures distance from the stereo camera to the face using an image frame which is provided from the stereo camera without a stereo matching process. Accordingly, the face detection apparatus simultaneously performs face detection and distance measurement even in a low-performance system.

20 Claims, 8 Drawing Sheets

FACE DETECTION APPARATUS AND DISTANCE MEASUREMENT METHOD USING THE SAME

CROSS-REFERENCE TO RELATED APPLICATIONS

This application claims priority under 35 U.S.C. §119 to Korean Patent Application No. 10-2009-0032372, filed on Apr. 14, 2009, in the Korean Intellectual Property Office, the disclosure of which is incorporated herein by reference in its entirety.

TECHNICAL FIELD

The following disclosure relates to a face detection apparatus, and in particular, to a face detection apparatus that detects a face using an image acquired from an image photographing device.

BACKGROUND

Face recognition technology requires a face detection technology as a pre-processing step. The face detection technology is implemented by discriminating face patterns and non-face patterns from an acquired face image.

To implement the face detection technology in hardware, it is required to design a database storing face and non-face pattern information and a look-up table having cost values of face features. Here, a cost value is a prediction value indicating the possibility that a face is present as a numerical value on the basis of statistical information that is autonomously collected.

By establishing the look-up table and the database having a large amount of face pattern information, the face detection technology provides superior face detection performance. Examples of face detection technology include a skin color-based approach, a Support Vector Machine (SVM) approach, a gaussian mixture approach, a maximum likelihood approach, and a neural network approach.

If such approaches use a database having a large amount of face information and a look-up table storing the cost values of face features, they ensure relatively high detection performance. However, the approaches cannot ensure real-time face detection performance due to the time taken in accessing the look-up table, image scaling, and excessive addition operations.

Recently, research has been conducted on intelligent robots to which face recognition technology has been applied. In the development of intelligent robots to which face recognition technology is applied, various kinds of sensor technologies are required. Intelligent robots require a distance sensing system for avoiding collisions and sensing obstacles, a position estimating system for detecting positions, and a visual sensing system for acquiring visual information. Among these systems, the visual sensing system that includes a visual sensor is important in performing the perception functions of a robot.

The visual sensor acquires images in real-time through a camera and converts the acquired images into image data. The visual sensor processes the image data in real-time and analyzes information on the size, position and color of an object (for example, a person or a face), and distance to the object to perceive the object. Here, the distance information between the object and the visual sensor may be obtained through a stereo matching operation.

FIG. 1 is a diagram illustrating the geometrical structure of a stereo matching system which performs a stereo matching operation.

Referring to FIG. 1, if a baseline B between the lenses 12 and 14 of two separated cameras, a disparity between objects in two images which are acquired from the respective cameras and a lens focal length F are given, a distance R between an object 22 and each of the camera lenses 12 and 14 can be obtained using Equation (1) below, based on the geometrical structure of FIG. 1.

$$R = F\frac{B}{D} \quad (1)$$

where R is distance between an object and a camera, B is the length of a baseline between the lenses of two cameras, F is a focal length of a camera lens, and D is distance difference, which is "DP1−DP2", between the same object in two images.

The two image processing functions, that is, the face detection technology and the stereo matching operation technology are core technologies in human-robot interaction. However, it is difficult to concurrently implement the face detection technology and the stereo matching operation technology in low-performance systems such as non-robot small mobile devices, due to large operation volumes.

SUMMARY

In one general aspect, a face detection apparatus includes a stereo camera unit, and a face detection unit. The stereo camera unit generates a left image frame and a right image frame, each of which includes a face, to individually output the left and right image frames. The face detection unit detects a left face block including the face from the left image frame, and detects a right face block including the face from the right image frame. Herein, the face detection unit calculates coordinate difference of the left face block and the right face block, and measures distance from the stereo camera unit to the face on the basis of the coordinate difference.

In another general aspect, a face detection apparatus includes a stereo camera unit, a block detector, a block matching detector, and a coordinate difference calculator. The stereo camera unit generates left and right image frames which comprise a plurality of faces. The block detector detects a plurality of left face blocks including the respective faces which exist in the left image frame, and detects a plurality of right face blocks including the respective faces which exist in the right image frame. The block matching detector detects block matching between the left face block and the right face block using an epipolar line. The coordinate difference calculator calculates coordinate difference of the detected left and right face blocks, and calculates distance from the stereo camera unit to a face corresponding to the detected left and right face blocks, on the basis of the coordinate difference.

In another general aspect, a distance measurement method comprises: providing a left image frame including a face and a right image frame including the face by using an imaging device; detecting a left face block including the face in the left image frame and a right face block including the face in the right image frame; determining whether block matching between the left face block and the right face block is achieved, using an epipolar line; and calculating coordinate difference between the left face block and the right face block, and calculating distance from the imaging device to the face on the basis of the calculated coordinate difference, when block matching between the left face block and the right face block is achieved.

Other features and aspects will be apparent from the following detailed description, the drawings, and the claims.

DETAILED DESCRIPTION OF EMBODIMENTS

Figure 1:
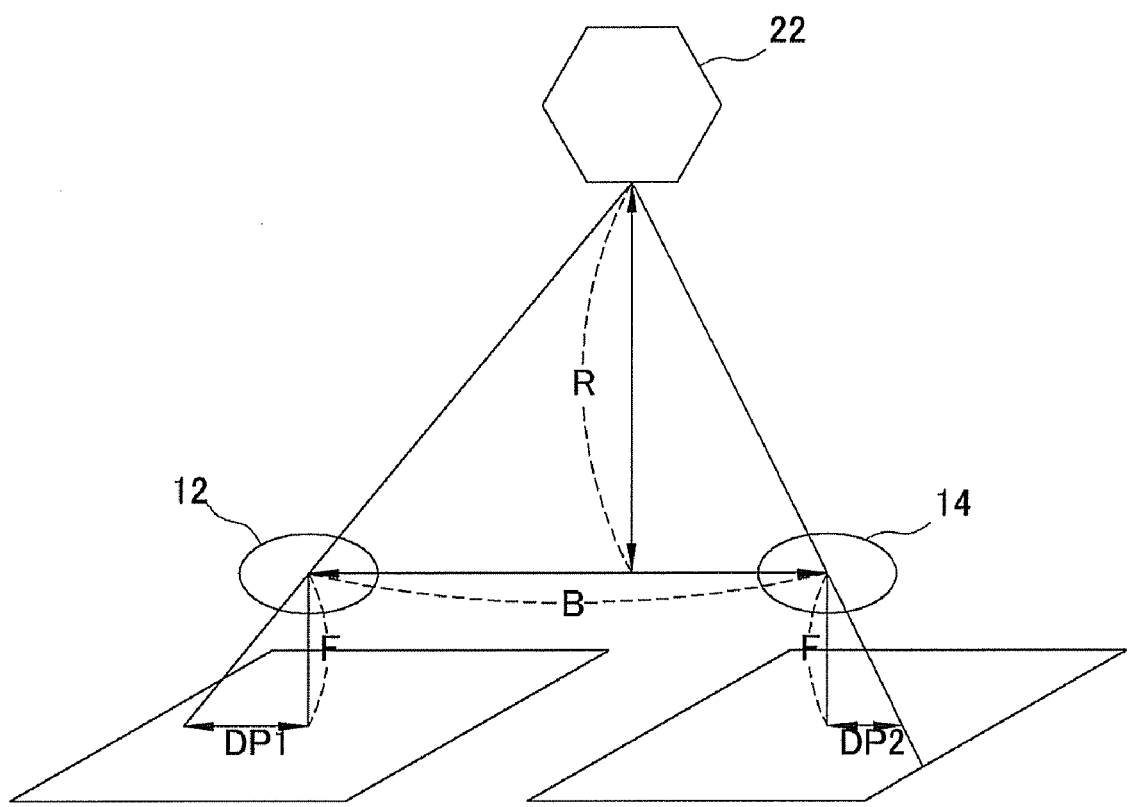
FIG. 1 is a diagram illustrating the geometrical structure of a stereo matching system which performs a stereo matching operation.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

In this specification, the term 'block' may mean any physical form, and it may also mean the set of information or the set of data that is configured by block unit. Accordingly, the term 'block' may be replaced with a term 'block information' or 'block data'. The term 'face block pair' used in the specification may be interpreted as a combination composed of one left face block and one right face block.

Figure 2:
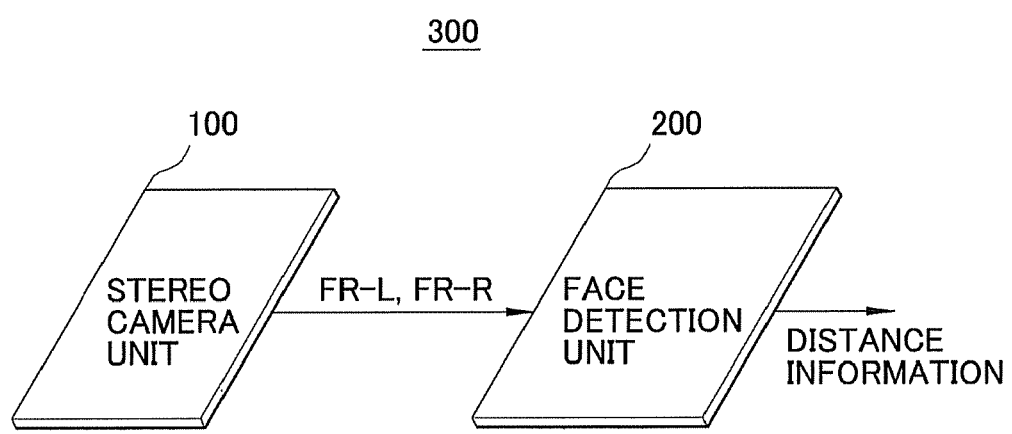
FIG. 2 is a block diagram illustrating a face detection apparatus using stereo images according to an exemplary embodiment.

FIG. 2 is a block diagram illustrating a face detection apparatus using stereo images according to an exemplary embodiment.

Referring to FIG. 2, a face detection apparatus 300 according to an exemplary embodiment includes a stereo camera unit 100 and a face detection unit 200.

The stereo camera unit 100 includes a stereo camera which is separated by a certain distance from a face. The stereo camera unit 100 generates a left image frame FR-L and a right image frame FR-R, each of which includes the face, through the stereo camera and alternately outputs the left image frame FR-L and the right image frame FR-R.

The face detection unit 200 alternately receives the left image frame FR-L and the right image frame FR-R, detects a left face block including the face from the left image frame FR-L, and detects a right face block including the face from the right image frame FR-R. Moreover, the face detection unit 200 calculates the coordinate difference (i.e., disparity) of an abscissa-axis direction (i.e., a horizontal direction or an X-axis direction) between the center coordinates of the left face block and the center coordinates of the right face block. Herein, the center coordinates of the left face block mean the pixel coordinates of the left image frame corresponding to the center of the left face block, and the center coordinates of the right face block mean the pixel coordinates of the right image frame corresponding to the center of the right face block.

The face detection unit 200 calculates distance information from the stereo camera to the face on the basis of the calculated coordinate difference.

Thus, the face detection apparatus 300 calculates distance information DI from the stereo camera to the face without the complicated stereo matching operation that has been described with reference to FIG. 1. That is, the face detection apparatus 300 measures distance from the stereo camera to the face by using only the left image frame and the right image frame that are acquired from the stereo camera unit 110.

Accordingly, the face detection apparatus 300 does not require the complicated stereo matching operation, and thus simultaneously performs face detection and distance measurement without decreasing performance even in a low-performance system.

Hereinafter, the face detection apparatus 300 according to an exemplary embodiment will be described in detail.

Figure 3:
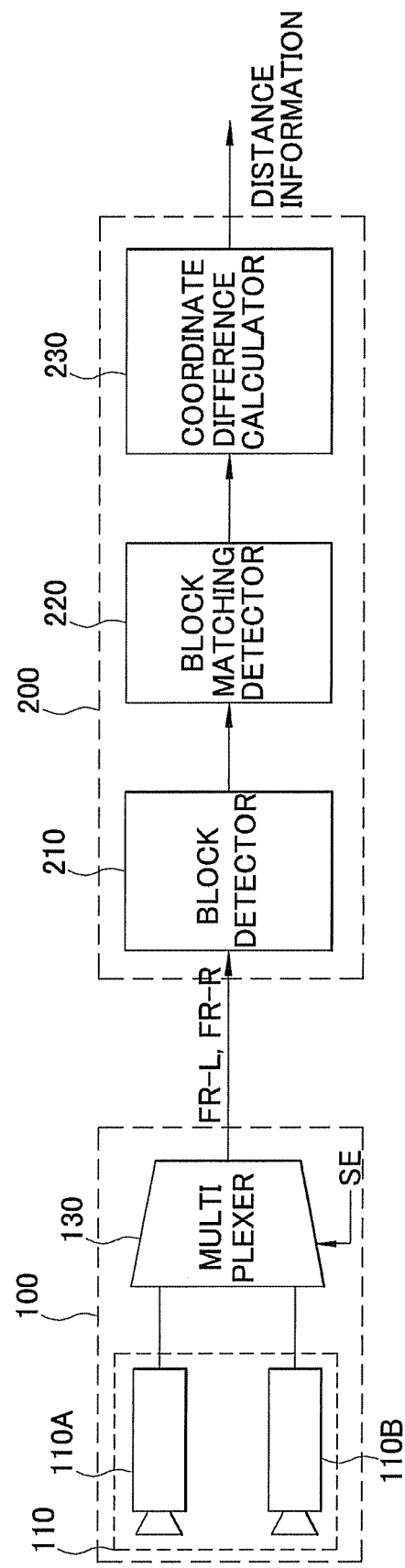
FIG. 3 is a block diagram illustrating in detail the face detection apparatus in FIG. 2.

FIG. 3 is a block diagram illustrating the face detection apparatus in FIG. 2 in detail.

Referring to FIG. 3, the stereo camera unit 100 includes a stereo camera 110 including a left camera 110A and a right camera 110B, and a multiplexer 130.

The left camera 110A generates a left image frame including a face which is seen from the left. The right camera 110B generates a right image frame including a face which is seen from the right. When there are more than one persons' faces, the left camera 110A generates a left image frame including a plurality of faces which are seen from the left. The right camera 110B generates a right image frame including a plurality of faces which are seen from the right.

The multiplexer 130 receives the left image frame and the right image frame at the same time, and alternately outputs the left image frame and the right image frame by frame unit in response to a selection signal SEL which is provided from an external device (not shown). The selection signal SEL may be a clock signal having a high level and a low level that are periodically repeated. When the selection signal SEL is the clock signal, the multiplexer 130 may selectively output the left image frame in response to the low level of the clock signal and may selectively output the right image frame in response to the high level of the clock signal. Accordingly, the face detection unit 200 alternately receives the left image frame FR-L and the right image frame FR-R from the multiplexer 130.

The face detection unit 200 includes a block detector 210, a block matching detector 220, and a coordinate difference calculator 230.

The block detector 210 alternately receives the left image frame FR-L and the right image frame FR-R, detects a left face block from the left image frame FR-L, and detects a right face block from the right image frame FR-R. For example, when the block detector 210 detects the left face block, it sets a quadrangular block in a region, which is determined to include a face, in the left image frame FR-L, and extracts the coordinate information of the block. The coordinate information is determined as the left face block. Likewise, the right face block is also detected by the block detector 210.

When a plurality of faces exist in the left image frame FR-L, the block detector 210 sets a plurality of quadrangular blocks in respective regions, which are determined to include the faces, in left image frame FR-L. Then, a plurality of left face blocks are detected.

When a plurality of faces exist in the right image frame FR-R, likewise, a plurality of right face blocks are detected by the block detector 210.

The block matching detector 220 determines whether the left face block and the right face block, which are detected by the block detector 210, are detected from the same face, which is called block matching. When the determination result shows that the left face block and the right face block are detected from the same face, the block matching detector 220 extracts corresponding blocks.

Specifically, the block matching detector 220 determines whether the left face block(s) and the right face block(s) exist on the same epipolar line. When two or more left and right face blocks exist on the same epipolar line, the block matching detector 220 compares the block sizes of the left face blocks with the block sizes of the right face blocks. The block matching detector 220 determines the left and right face blocks having the same block size as finally-matched blocks according to the comparison result.

The face sizes of people are not much different from an average face size. Accordingly, faces that are separated by the same distance from the stereo camera 110 are detected as similar quadrangular block sizes by block detector 210. The left and right face blocks having high matching possibility, therefore, are identically detected at a certain size of margin.

The coordinate difference calculator 230 calculates coordinate difference between the center coordinates of the left face block and the center coordinates of the right face block. Herein, the coordinate difference calculator 230 calculates the coordinate difference in abscissa-axis direction between the center coordinates of the left and right face blocks, and calculates distance from the stereo camera 110 to the face (which corresponds to the left and right face blocks) on the basis of the coordinate difference.

Figure 4:
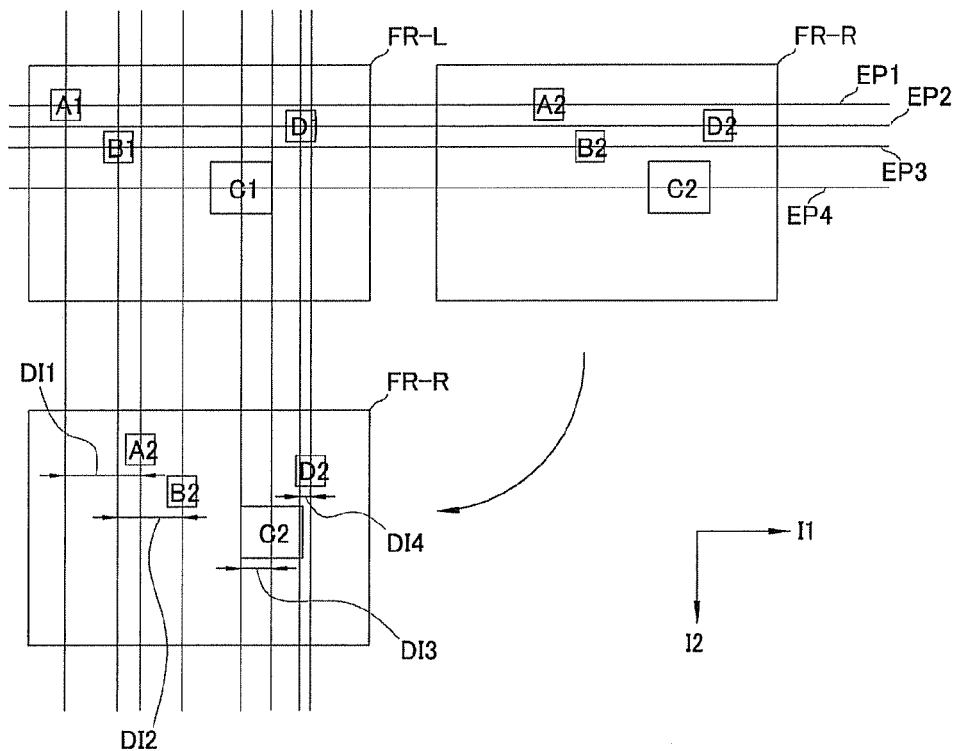
FIG. 4 is a diagram illustrating a process for calculating coordinate difference in the coordinate difference calculator of FIG. 3, according to an exemplary embodiment.

FIG. 4 is a diagram illustrating a process for calculating coordinate difference in the coordinate difference calculator of FIG. 3, according to an exemplary embodiment.

As an example, FIG. 4 illustrates a case where the coordinate difference calculator 230 detects four faces, which are located at different distances from the camera, from the stereo camera 110 in FIG. 2. The coordinate difference calculator 230 detects four block pairs (A1, A2), (B1, B2), (C1, C2), and (D1 D2) which exist on four epipolar lines EP1, EP3, EP4 and EP2, respectively. That is, the block matching detector 220 (shown in FIG. 3) detects the 1-1th left face block A1 of the left image frame FR-L and the 1-2th right face block A2 of the right image frame FR-R which exist on the first epipolar line EP1. The block matching detector 220 detects the 2-1th left face block B1 of the left image frame FR-L and the 2-2th right face block B2 of the right image frame FR-R which exist on the third epipolar line EP3. The block matching detector 220 detects the 3-1th left face block C1 of the left image frame FR-L and the 3-2th right face block C2 of the right image frame FR-R which exist on the fourth epipolar line EP4. The block matching detector 220 detects the 4-1th left face block D1 of the left image frame FR-L and the 4-2th right face block D2 of the right image frame FR-R which exist on the second epipolar line EP2.

When the right image frame FR-R (which is disposed in an abscissa-axis direction I1 with respect to the left image frame FR-L) is moved in an ordinate-axis direction I2 with respect to the left image frame FR-L, a reference number 'DI1' is the coordinate difference of an abscissa-axis direction between the center coordinates of the 1-1th left face block A1 and the center coordinates of the 1-2th right face block A2, a reference number 'DI2' is the coordinate difference of an abscissa-axis direction between the center coordinates of the 2-1th left face block B1 and the center coordinates of the 2-2th right face block B2, a reference number 'DI3' is the coordinate difference of an abscissa-axis direction between the center coordinates of the 3-1th left face block C1 and the center coordinates of the 3-2th right face block C2, and a reference number 'DI4' is the coordinate difference of an abscissa-axis direction between the center coordinates of the 4-1th left face block D1 and the center coordinates of the 4-2th right face block D2. The coordinate differences DI1 to DI4 are calculated by the coordinate difference calculator 230 in FIG. 3. The coordinate difference calculator 230 calculates distance information from the stereo camera 110 to the respective faces on the basis of the coordinate differences DI1 to DI4.

Figure 5:
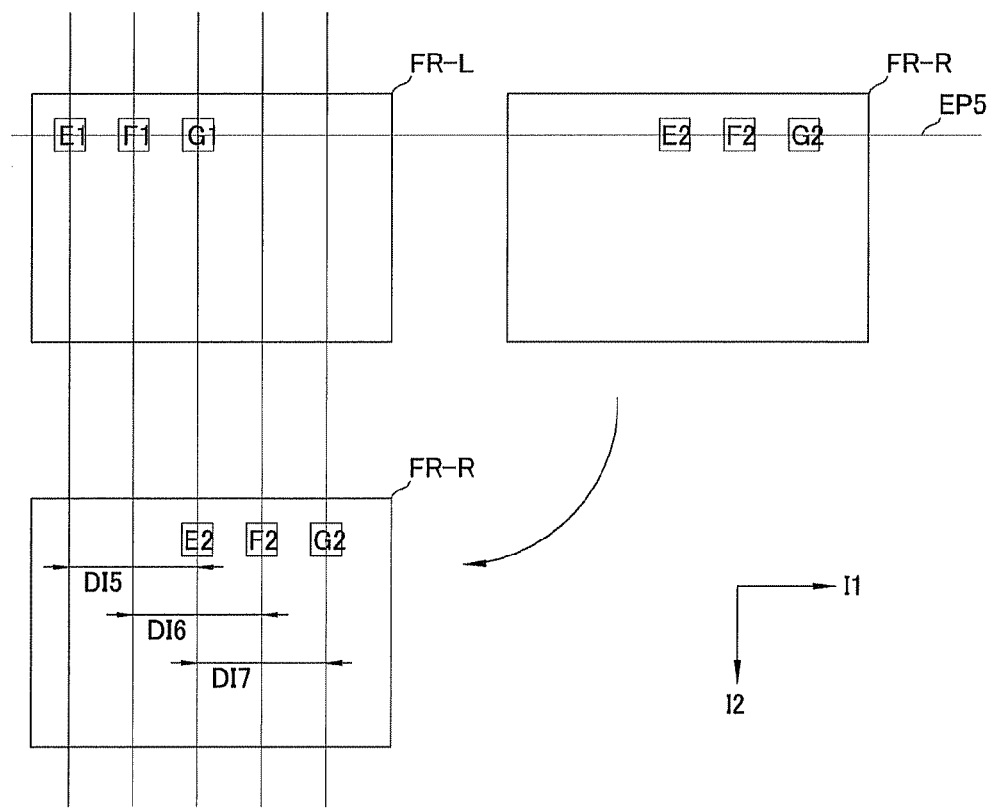
FIG. 5 is a diagram illustrating a process for calculating coordinate difference in the coordinate difference calculator of FIG. 3, according to another exemplary embodiment.

FIG. 5 is a diagram illustrating a process for calculating coordinate difference in the coordinate difference calculator of FIG. 3, according to another exemplary embodiment.

Unlike in FIG. 4 that illustrates a case where the coordinate difference calculator 230 detects the four faces that are located at different distances from the stereo camera 110 (shown in FIG. 2), FIG. 5 illustrates a case where the coordinate difference calculator 230 detects three faces that are located at the same distance from the stereo camera 110.

As described above, because the face sizes of people is not much different from an average face size, faces that are located at the same distance from the stereo camera 110 are detected as blocks of similar sizes. Accordingly, block pairs having the same block size exist on one epipolar line EP5. That is, as shown in FIG. 5, the block matching detector 220 (shown in FIG. 3) detects the 5-1th left face block E1, 6-1th left face block F1, and 7-1th left face block G1 of the left image frame FR-L, and the 5-2th right face block E2, 6-2th right face block F2, and 7-2th right face block G2 of the right image frame FR-R on the same epipolar line EP5.

When the right image frame FR-R (which is disposed in an abscissa-axis direction I1 with respect to the left image frame FR-L) is moved in an ordinate-axis direction I2 with respect to the left image frame FR-L, a reference number 'DI5' is the coordinate difference of an abscissa-axis direction between the center coordinates of the 5-1th left face block E1 and the center coordinates of the 5-2th right face block E2, a reference number 'DI6' is the coordinate difference of an abscissa-axis direction between the center coordinates of the 6-1th left face block F1 and the center coordinates of the 6-2th right face block F2, and a reference number 'DI7' is the coordinate difference of an abscissa-axis direction between the center coordinates of the 7-1th left face block G1 and the center coordinates of the 7-2th right face block G2. The coordinate differences are calculated by the coordinate difference calculator 230. However, the coordinate difference calculation process in FIG. 5 differs from the coordinate difference calculation process in FIG. 4.

In FIG. 5, because the three faces are located at the same distance from the stereo camera 110, the coordinate difference calculator 230 calculates only the coordinate difference of any one of three block pairs (E1, E2), (F1, F2), and (G1, G2), and does not calculate the coordinate differences of other two block pairs. For example, the coordinate difference calculator 230 calculates only the coordinate difference DI5 of the abscissa-axis direction of the leftmost block pairs (E1, E2), and does not calculate the coordinate differences DI6 and DI7 of the block pairs (F1, F2) and (G1, G2). In this case, the coordinate difference calculator 230 calculates only the distance information from the stereo camera 110 to a face corresponding to the leftmost block pair (E1, E2) on the basis of the coordinate difference DI5 of the leftmost block pairs (E1, E2), and the calculated distance information for the leftmost block pairs (E1, E2) is applied to the distance information of the block pairs (F1, F2) and (G1, G2).

The distance information of only one block pair is calculated when the block pairs having the same block size exist on one epipolar line, and thus a whole system process is simplified. Accordingly, the processing speed of a whole system improves, and a low-performance system can be designed to minimize an operation load.

Figure 6:
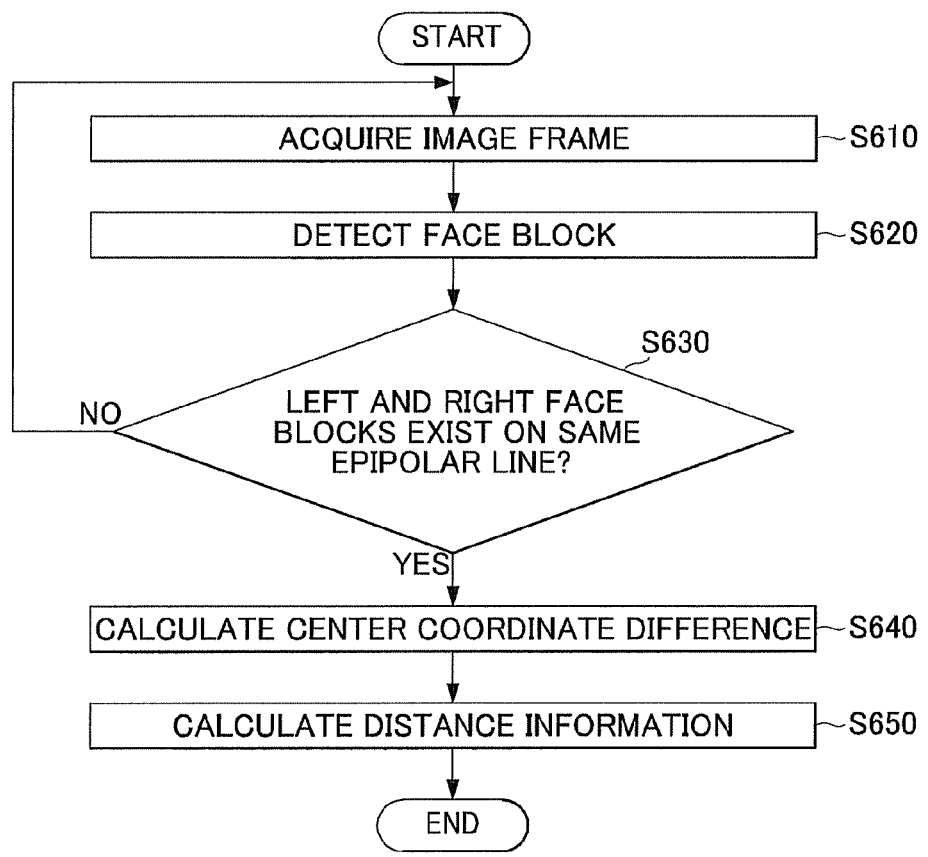
FIG. 6 is a flowchart illustrating the basic conception of a distance measurement method using the face detection apparatus in FIG. 3.

FIG. 6 is a flowchart illustrating the basic conception of a distance measurement method using the face detection apparatus shown in FIG. 3.

Referring to FIGS. 3 and 6, left and right image frames including a face are acquired through the stereo camera 110 in step S610. If a stereo vision processor including a stereo camera is connected to a face detection system, the face detection system is generally designed to receive one stereo matching image through a stereo matching process which is performed in the stereo vision processor. In an exemplary embodiment, on the other hand, two image frames FR-L and FR-R are alternately inputted to the face detection unit 200 by the multiplexer 130 of the stereo camera unit 100, and a series of process (which is performed each time in the face detection unit 200) is performed by two-frame unit.

The block detector 210 detects a left face block from the left image frame FR-L and a right face block from the right image frame FR-R in step S620.

The block matching detector 220 determines whether the detected left and right face blocks exist on the same epipolar line, in step S630. When the determination result shows that the detected left and right face blocks do not exist on the same epipolar line, two new image frames are acquired, and the steps S610 and S620 are repeated.

When the determination result shows that the detected left and right face blocks exist on the same epipolar line, the coordinate difference calculator 230 calculates, in step S640, the coordinate difference in abscissa-axis direction I1 (shown in FIGS. 4 and 5) between the center coordinates of the left face block and the center coordinates of the right face block.

Finally, distance information is calculated on the basis of the calculated coordinate difference in step S650. A process for calculating distance information on the basis of the coordinate difference between the face blocks is a known technology, and its specific description will be omitted.

Figure 7:
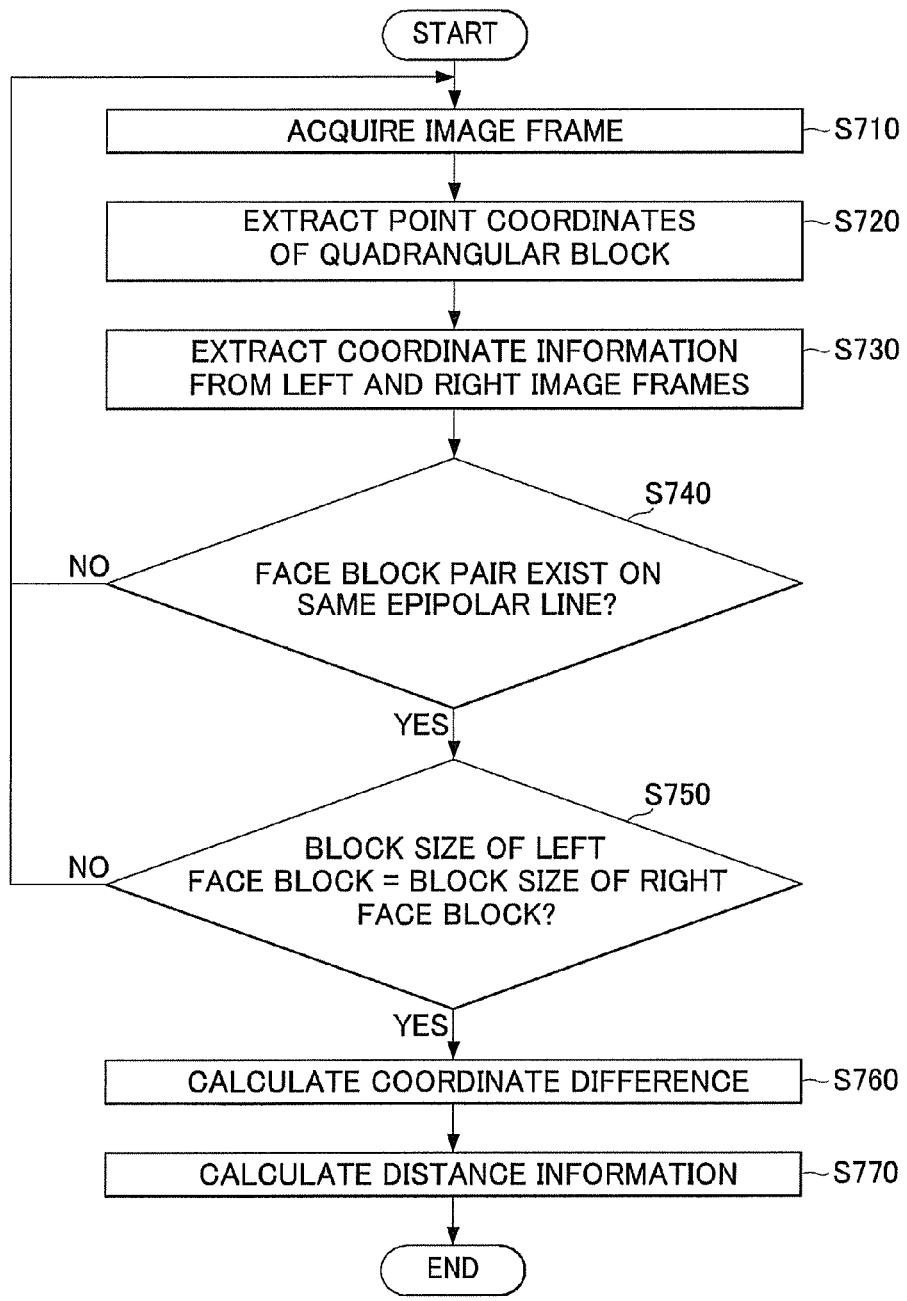
FIG. 7 is a flowchart illustrating a distance measurement method, according to an exemplary embodiment, when detecting a plurality of faces which are located at different distances from the stereo camera.

FIG. 7 is a flowchart illustrating a distance measurement method according to an exemplary embodiment, when a plurality of faces, which are located at different distances from the stereo camera, are detected.

Referring to FIGS. 3 and 7, the stereo camera unit 100 acquires a left image frame including a plurality of faces and a right image frame including the plurality of faces in step S710.

The block detector 210 detects a plurality of left face blocks from the left image frame, and detects a plurality of right face blocks from the right image frame. That is, quadrangular blocks, each of which including a face is set, and the coordinates of the four points of the quadrangular blocks are extracted in step S720. Thus, face blocks of quadrangular shape are detected on the basis of the extracted coordinates of the four points. Since the plurality of faces exist in each of the left and right image frames, a plurality of left and right face blocks are detected. Subsequently, the coordinate information of all the pixels included in the each image frame is extracted in step S730.

The block matching detector 220 determines whether block matching between the left face blocks and the right face blocks is achieved in steps S740 and S750. Specifically, the block matching detector 220 determines whether at least one face block pair exists on the same epipolar line among the left face blocks included in the left image frame and the right face blocks included in the right image frame in step S740.

When the determination result shows that the face block pair does not exist on the same epipolar line, the steps S710, S720 and S730 are repeated. When the determination result shows that at least one face block pair exists on the same epipolar line, the block size of the left face block constituting a corresponding face block pair is compared with that of the right face block constituting the corresponding face block pair in step S750.

When the comparison result shows that the block size of the left face block differs from that of the right face block, the steps S710, S720, S730 and S740 are repeated.

On the other hand, when the comparison result shows that the block size of the left face block is the same as that of the right face block, the coordinate difference calculator 230 (shown in FIG. 3) calculates the coordinate difference of an abscissa-axis direction between the center coordinates of the left and right face blocks having the same block size in step S760.

Finally, distance information from the stereo camera 110 to a corresponding face is calculated on the basis of the calculated coordinate difference in step S770.

Figure 8:
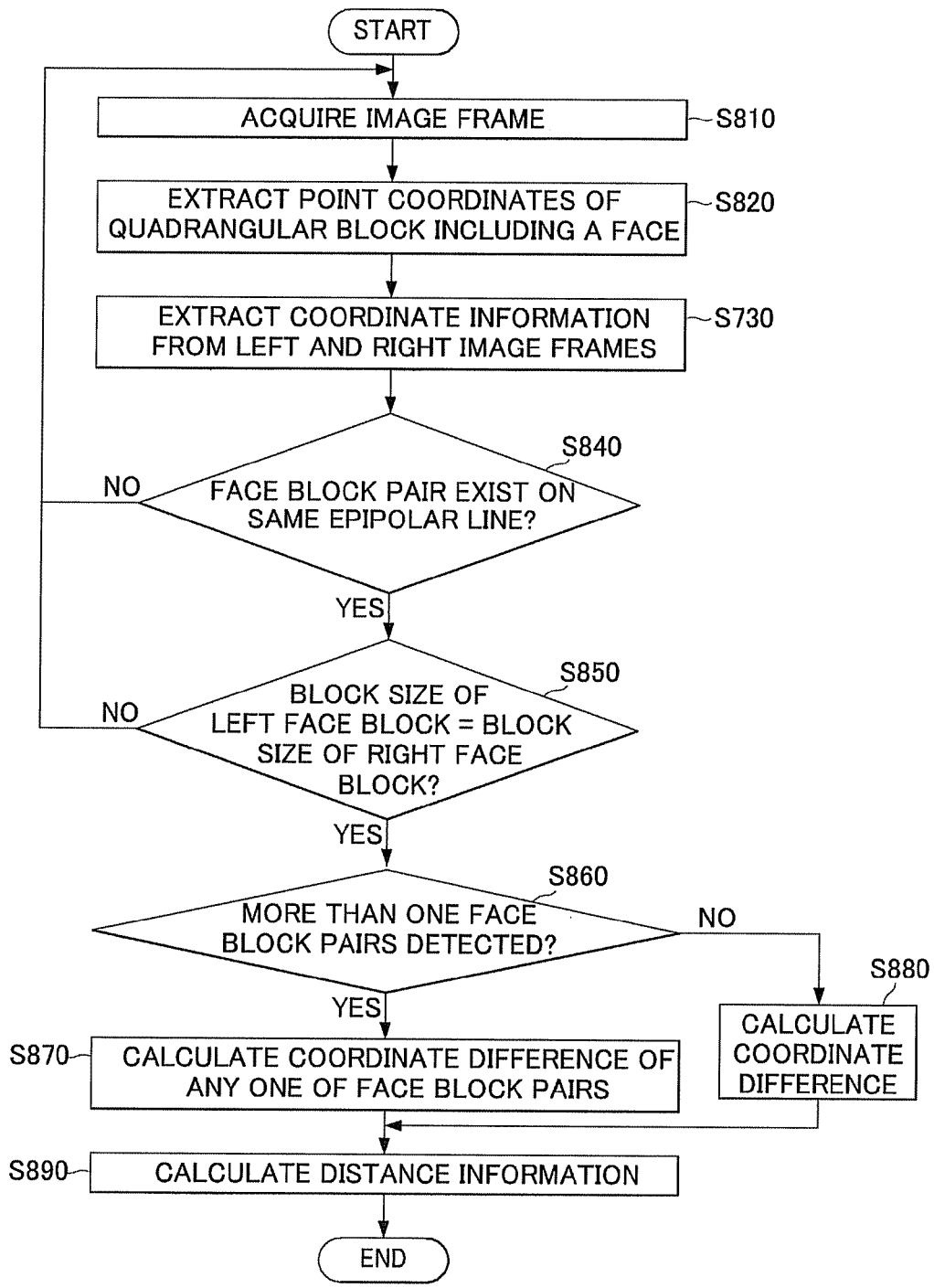
FIG. 8 is a flowchart illustrating a distance measurement method according to another exemplary embodiment, when detecting a plurality of faces, which are located at the same distance, on the same epipolar line.

FIG. 8 is a flowchart illustrating a distance measurement method according to another exemplary embodiment, when detecting a plurality of faces, which are located at the same distance, on the same epipolar line.

The steps S810 to S850 in FIG. 8 are the same as the steps S710 to S750, respectively, and thus their specific description will be omitted.

A plurality of face block pairs having the same block size which exist on the same epipolar line are detected though the steps S810 to S850. When the plurality of face block pairs are detected in step S860, only the coordinate difference of any one of the face block pairs is calculated in step S870, instead of calculating the coordinate difference of all the face block pairs. For example, as shown in FIG. 5, only the coordinate difference DI5 of the abscissa-axis direction of the leftmost face block pairs (E1, E2) among the three face block pairs (E1, E2), (F1, F2), and (F1, F2) is calculated, and the coordinate difference of other face block pairs (F1, F2) and (F1, F2) is not calculated.

Then, distance information from the stereo camera to the face corresponding to the leftmost face block pairs (E1, E2) is calculated on the basis of the coordinate difference of the leftmost face block pairs (E1, E2) in step S890. The distance information of the leftmost face block pairs (E1, E2) is applied to the distance information of the other block pairs (F1, F2) and (G1, G2).

Step S880 of calculating coordinate difference in FIG. 8 is the same as the step S760 in FIG. 7, and thus its specific description will be omitted.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A face detection apparatus, comprising:
a stereo camera unit generating a left image frame and a right image frame, each of which includes a face, to individually output the left and right image frames; and a face detection unit detecting a left face block including the face from the left image frame, and detecting a right face block including the face from the right image frame,
wherein the face detection unit calculates coordinate difference of the left face block and the right face block, and measures distance from the stereo camera unit to the face on the basis of the coordinate difference.

2. The face detection apparatus of claim 1, wherein the stereo camera unit alternately outputs the left image frame and the right image frame.

3. The face detection apparatus of claim 2, wherein the stereo camera unit comprises:
a stereo camera comprising a left camera generating the left image frame and a right camera generating the right image frame; and
a multiplexer receiving the left and right image frames to alternately output the left and right image frames.

4. The face detection apparatus of claim 1, wherein:
the face detection unit determines whether the left and right face blocks exist on the same epipolar line, and
the face detection unit calculates the coordinate difference when the left and right face blocks exist on the same epipolar line.

5. The face detection apparatus of claim 1, wherein, when the left and right image frames are aligned in an ordinate-axis direction and are seen on a plane,
the face detection unit calculates coordinate difference in abscissa-axis direction between center coordinates of the left face block and center coordinates of the right face block.

6. A face detection apparatus, comprising:
a stereo camera unit generating left and right image frames which include a plurality of faces;
a block detector detecting a plurality of left face blocks including the respective faces which exist in the left image frame, and detecting a plurality of right face blocks including the respective faces which exist in the right image frame;
a block matching detector detecting block matching between the left face block and the right face block using an epipolar line; and
a coordinate difference calculator calculating coordinate difference of the detected left and right face blocks, and calculating distance from the stereo camera unit to a face corresponding to the detected left and right face blocks, on the basis of the coordinate difference.

7. The face detection apparatus of claim 6, wherein the stereo camera unit alternately outputs the left image frame and the right image frame without stereo matching between the left image frame and the right image frame.

8. The face detection apparatus of claim 6, wherein, when the block matching detector has detected a face block pair which comprises the left and right face blocks existing on the same epipolar line, the block matching detector compares block sizes of the left and right face blocks constituting the detected face block pair.

9. The face detection apparatus of claim 8, wherein, when the block matching detector has detected a plurality of face block pairs having the same block size,
the coordinate difference calculator calculates the coordinate difference of any one of the face block pairs.

10. The face detection apparatus of claim 9, wherein the coordinate difference calculator calculates the coordinate difference of the face block pair composed of the left face block existing in a leftmost position in the left image frame and the right face block existing in a leftmost position in the right image frame, among the plurality of face block pairs.

11. The face detection apparatus of claim 9, wherein, when the left and right image frames are aligned in an ordinate-axis direction and are seen on a plane,
the coordinate difference calculator calculates the coordinate difference in abscissa-axis direction between center coordinates of the left face block and center coordinates of the right face block.

12. The face detection apparatus of claim 6, wherein the block detector, the block matching detector and the coordinate difference calculator are comprised in one chip as a module.

13. A distance measurement method, comprising:
providing a left image frame including a face and a right image frame including the face by using an imaging device;
detecting a left face block including the face in the left image frame and a right face block which including the face in the right image frame;
determining whether block matching between the left face block and the right face block is achieved, using an epipolar line; and
calculating coordinate difference between the left face block and the right face block, and calculating distance from the imaging device to the face on the basis of the calculated coordinate difference, when block matching between the left face block and the right face block is achieved.

14. The distance measurement method of claim 13, wherein the providing of the left and right image frames comprises:
acquiring the left and right image frames through the imaging device comprising a stereo camera; and
alternately providing the acquired left and right image frames without a stereo matching process.

15. The distance measurement method of claim 13, wherein the determining of block matching comprises:
determining whether the left and right face blocks exist on the same epipolar line; and
comparing block sizes of the left and right face blocks when the left and right face blocks exist on the same epipolar line.

16. The distance measurement method of claim 15, further comprising determining whether there is more than one face block pair comprising the left and right face blocks of the same block size on the same epipolar line.

17. The distance measurement method of claim 16, wherein, when a plurality of face block pairs having the same block size are detected,
the calculating of distance comprises calculating the coordinate difference of any one of the face block pairs.

18. The distance measurement method of claim 17, wherein the one of the face block pairs is a face block pair composed of a leftmost face block in the left image frame and a leftmost face block in the right image frame.

19. The distance measurement method of claim 17, wherein the calculating of coordinate difference comprises calculating the coordinate difference between center coordinates of the left and right face blocks in any one of the face block pairs.

20. The distance measurement method of claim 19, wherein the coordinate difference is coordinate difference in abscissa-axis direction.

* * * * *